(12) United States Patent
Ng (10) Patent No.: US 7,275,302 B2
(45) Date of Patent: Oct. 2, 2007

(54) METHOD OF FORMING A DISC PACK

(75) Inventor: Hwaliang Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 491 days.

(21) Appl. No.: 10/731,275

(22) Filed: Dec. 9, 2003

(65) Prior Publication Data
US 2005/0122624 A1 Jun. 9, 2005

(51) Int. Cl.
*G11B 5/127* (2006.01)
*G11B 21/08* (2006.01)

(52) U.S. Cl. .............. 29/603.03; 29/603.1; 29/603.08; 29/603.09; 29/603.19; 360/264.5

(58) Field of Classification Search ............. 29/603.03, 29/603.09, 603.08, 603.1, 603.19; 360/48, 360/75, 265.5, 265.2, 77.08, 77.03, 48.75, 360/264.5, 264.2; 451/548, 449, 448; 219/121.68, 219/121.8
See application file for complete search history.

(56) References Cited

U.S. PATENT DOCUMENTS

| | | | |
|---|---|---|---|
| 4,754,447 A | 6/1988 | VanSant ..................... 369/270 |
| 4,933,927 A | 6/1990 | Ross ............................ 369/270 |
| 5,043,973 A | 8/1991 | Ocheltree et al. .......... 369/270 |
| 5,404,636 A * | 4/1995 | Stefansky et al. ........ 29/603.03 |
| 5,523,539 A * | 6/1996 | Hoogerwerf et al. .. 219/121.68 |
| 5,657,470 A | 8/1997 | Fisherman et al. ......... 395/480 |
| 5,824,898 A | 10/1998 | Brooks et al. ................ 73/469 |
| 6,101,876 A | 8/2000 | Brooks et al. ................ 73/468 |
| 6,105,240 A * | 8/2000 | Chuang et al. ............... 29/729 |
| 6,118,614 A | 9/2000 | Lee ............................. 360/75 |
| 6,158,112 A | 12/2000 | Kin et al. ..................... 29/729 |
| 6,189,371 B1 | 2/2001 | Hirano ......................... 73/66 |
| 6,312,325 B1 * | 11/2001 | Van Osenbruggen ....... 451/548 |
| 6,341,048 B1 * | 1/2002 | Morris et al. ............ 360/77.08 |
| 6,365,061 B1 * | 4/2002 | Damer et al. ................. 216/65 |
| 6,377,413 B1 * | 4/2002 | Sacks et al. ................... 360/48 |
| 6,421,199 B1 | 7/2002 | McKenzie et al. ....... 360/77.04 |
| 6,465,061 B2 * | 10/2002 | Trani ......................... 428/34.2 |
| 6,522,494 B1 * | 2/2003 | Magee ......................... 360/75 |
| 6,940,678 B2 * | 9/2005 | Kuo et al. ................ 360/77.03 |
| 2003/0063412 A1 | 4/2003 | Jierapopatanakul et al. ..... 360/99.08 |
| 2003/0081344 A1 | 5/2003 | Fioravanti et al. ............ 360/75 |

* cited by examiner

*Primary Examiner*—A. Dexter Tugbang
*Assistant Examiner*—Tai Van Nguyen
(74) *Attorney, Agent, or Firm*—Toler Schaffer LLP (57) ABSTRACT

A method of forming a disc pack for use in a disc drive is provided. The method includes forming at least one alignment feature between an inner diameter and an outer diameter of each of a plurality of discs. The at least one alignment feature of a first disc of the plurality of discs and the at least one alignment feature of a second disc of the plurality of discs are utilized to substantially vertically align servo patterns on the first disc with servo patterns on the second disc. A disc pack having discs that include alignment features for aligning servo patterns on the discs is also provided.

9 Claims, 7 Drawing Sheets

METHOD OF FORMING A DISC PACK

FIELD OF THE INVENTION

The present invention relates generally to data storage systems. In particular, the present invention relates to aligning servo patterns on different disc surfaces of a disc pack employed in disc a drive data storage system.

BACKGROUND OF THE INVENTION

Disc drives are data storage devices that store digital data on a rotating storage medium on a disc. Modern disc drives typically comprise a disc pack that includes multiple rigid discs that are coated with a magnetizable medium and mounted on the hub of a spindle motor for rotation at a constant high speed. Information is stored on the discs in a plurality of tracks typically by an array of transducers ("heads") mounted to a radial actuator or actuator arm for movement of the heads relative to the discs. Transducers are used to transfer data between a desired track and an external environment. During a write operation, sequential data is written onto the disc track and during a read operation, the head senses the data previously written onto the disc track and transfers the information to the external environment. Important to both of these operations is the accurate and efficient positioning of the head relative to the center of the desired track. Head positioning within a desired track is dependent on head-positioning servo patterns, i.e., a pattern of data bits used to maintain optimum track spacing and sector timing. Servo patterns can be recorded between the data sectors on each track of a disc, termed embedded servo, or on one dedicated surface of a disc within the disc drive, termed dedicated servo.

Traditionally, the servo patterns are written onto the disc in-situ (i.e., after the disc is mounted on the spindle motor of a disc drive) when the disc drive is manufactured and are thereafter simply read by the disc drive to determine position.

Recent advances in disc drive manufacturing have created a need for a disc drive with the servo patterns written, or pre-written, to the discs prior to assembly of the disc pack. In particular, some manufacturing efficiency has been realized by pre-writing the servo patterns to the disc during the manufacturing of the discs themselves.

The servo patterns on each disc surface typically include a servo timing index which serves as a reference position for the servo patterns. Servo timing indexes on different disc surfaces should be substantially vertically aligned (substantially overlap in a vertical direction) to facilitate normal operation of the disc drive servo system. In disc drives in which the servo patterns are written onto the discs in-situ, the servo patterns on different disc surfaces are substantially vertically aligned since the heads and discs are already in their final installed condition before the servo patterns are written. However, in disc drives employing pre-written discs, there is a need for vertically aligning servo patterns of different pre-written discs when the discs are installed in the drive.

Embodiments of the present invention provide solutions to these and other problems, and offer other advantages over the prior art.

SUMMARY OF THE INVENTION

A method of forming a disc pack for use in a disc drive is provided. The method includes forming at least one alignment feature between an inner diameter and an outer diameter of each of a plurality of discs. The at least one alignment feature of a first disc of the plurality of discs and the at least one alignment feature of a second disc of the plurality of discs are utilized to substantially vertically align servo patterns on the first disc with servo patterns on the second disc. A disc pack having discs that include alignment features for aligning servo patterns on the discs is also provided.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, discs of a disc pack employed in a disc drive include alignment features, which are utilized for vertically aligning servo patterns written on the discs.

Figure 1:
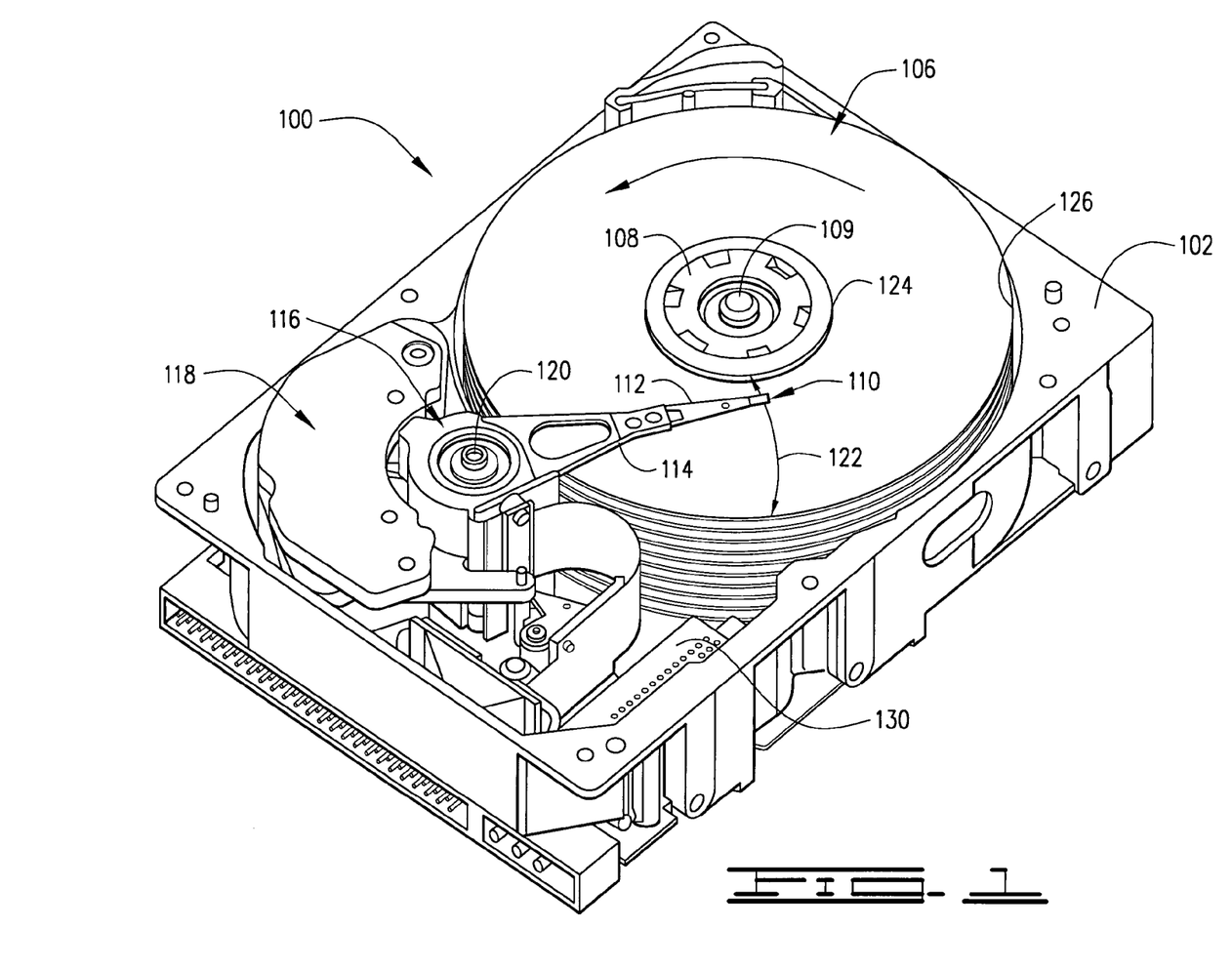
FIG. 1 is a perspective view of a disc drive.

FIG. 1 is a perspective view of a disc drive 100 in which embodiments of the present invention are useful. The same reference numerals are used in various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter (ID) 124 and a disc outer diameter (OD) 126. Voice coil motor 118 is driven by servo electronics 130 based on signals generated by heads 110 and a host computer (not shown). Servo patterns written on discs of disc pack 106 are used to control heads 110 during track seeking and track following operations. The servo patterns are written, or pre-written, to the discs prior to the assembly of disc pack 106. A dedicated servo writer or multi-disc writer (MDW), described below in connection with FIG. 2, can be used to write servo patterns on discs.

Figure 2:
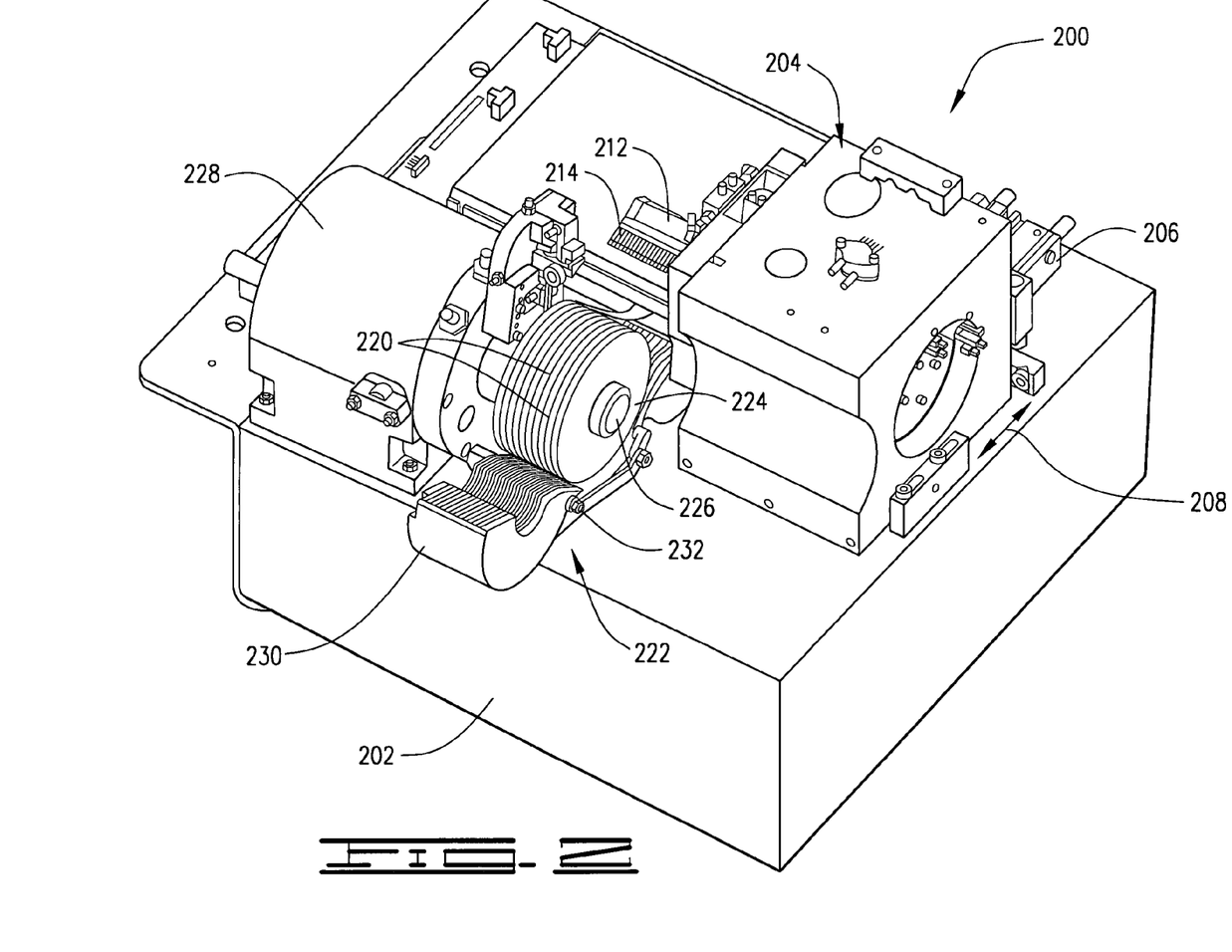
FIG. 2 is a perspective view of a multi-disc writer (MDW) used for servo track writing.

FIG. 2 is a perspective view of a MDW used for servo track writing. MDW 200 sits upon a substantially immobile and horizontally positioned platform or granite slab 202. An actuator assembly 204 is connected to platform 202 via a slide mechanism 206 for lateral movement (as indicated by arrow 208) over platform 202 between a servo writing position (not shown) and a disc loading and unloading position as shown in FIG. 2. Actuator assembly 204 includes an E-block 212 having a plurality of actuator arms 214 for positioning a plurality of servo recording heads (not separately shown in FIG. 2) to write servo patterns onto a plurality of target discs 220. Discs 220 are preferably secured to a spindle motor hub assembly 222 in a vertical orientation and are loaded as a pack 224 on a removable spindle hub 226 so that hub 226 and the pack of discs 220 can be detached from a spindle motor 228 to ease the process of loading and unloading discs 220 from spindle motor hub assembly 222.

Once discs 220 have been loaded on spindle motor hub assembly 222, actuator assembly 204 is preferably moved laterally along platform 202 (in the direction of arrow 208) toward spindle motor hub assembly 222. A comb (not shown) is preferably used to maintain proper separation between the heads at the ends of actuator arms 214 so that actuator assembly 204 and disc pack 224 on spindle motor hub assembly 222 may merge without unintentional contact between the heads and discs 220. Once the actuator assembly 204 is locked into the servo writing position so that the heads are positioned within the gaps between adjacent discs 220, the comb (not shown) is rotated away from E-block 212 to allow the heads to engage their respective discs as a result of the bias force provided by flexures at the ends of each actuator arm 214. Of course, the servo writing heads do not make physical contact with the respective disc surfaces since spindle motor 228 is activated to spin discs 220 at a predetermined rate prior to disengaging the comb. When spindle motor 228 is activated and the heads are in position, servo pattern writing is carried out by MDW 200. Servo pattern writing includes writing timing information such as servo timing indexes. The servo writing procedure will not be discussed further herein, as the details of this procedure are not important to the present invention.

As mentioned above, in disc drives employing pre-written discs, there is a need for vertically aligning servo patterns of different pre-written discs when the discs are installed in the drive. Under the present invention, at least one alignment feature, which is utilized for vertically aligning servo patterns of different pre-written discs, is included in each pre-written disc. Preferably, the at least one alignment feature is included in each disc prior to writing servo patterns on the disc surfaces. This is because the alignment features can be utilized to align the discs when they are stacked in a dedicated servo writer (such as MDW 200).

Figure 3:
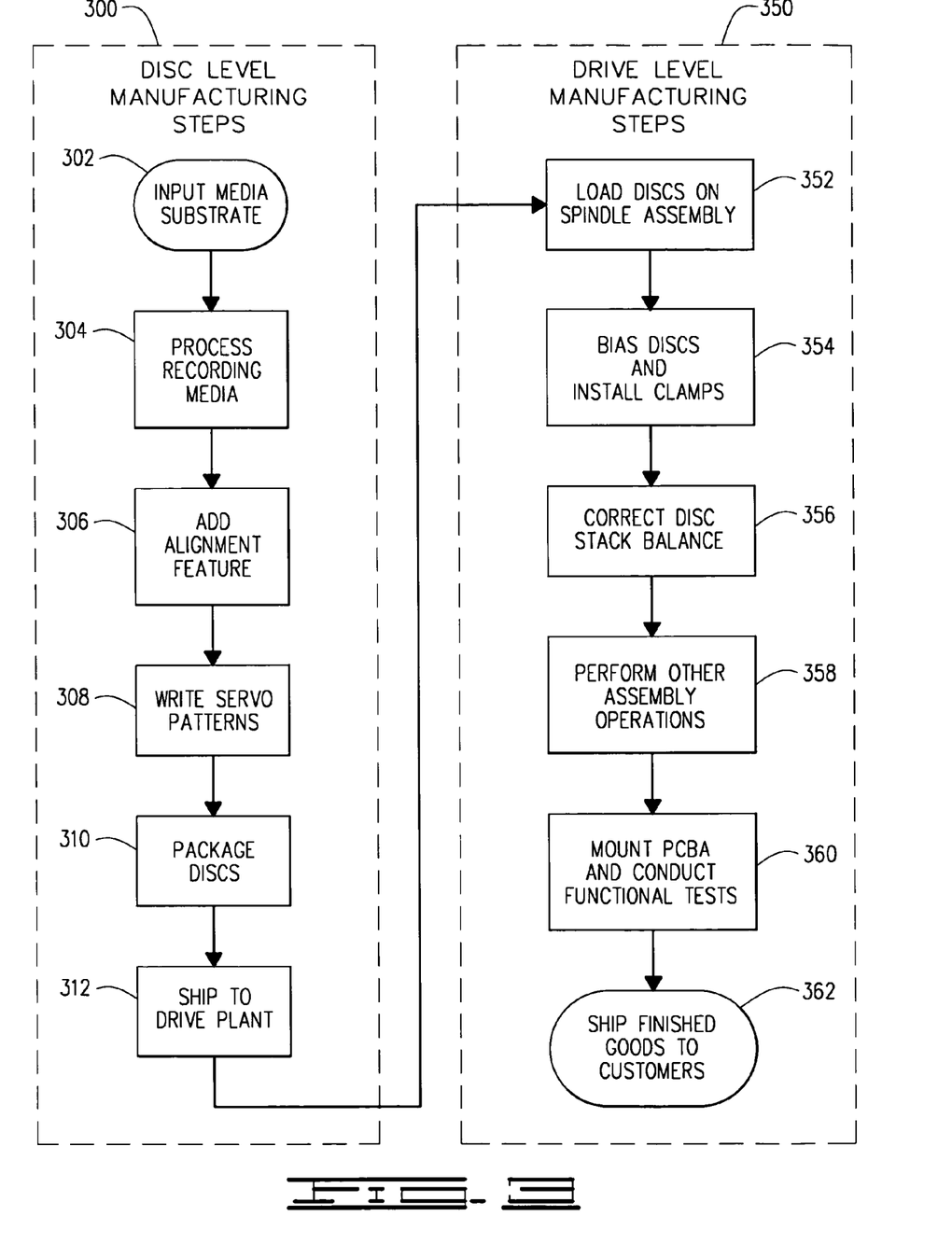
FIG. 3 is a flow diagram showing disc drive manufacturing steps.

FIG. 3 is a flow diagram showing manufacturing steps associated with disc drives utilizing pre-written discs that include alignment features in accordance with embodiments of the present invention. As can be seen in FIG. 3, the manufacturing process includes a series of disc level manufacturing steps 300 and drive level manufacturing steps 350. Disc level manufacturing steps 300 begin at step 302 where recording media substrates (discs without coatings of a magnetizable medium, for example) are input into the disc level manufacturing system. At step 304, recording media processing operations, which essentially involve the formation of recording media coatings on the recording media substrates, are carried out using known techniques. At step 306, alignment features are formed on the recording discs. Different types of alignment features and details regarding the formation of alignment features are provided further below. At step 308, the discs are first mounted on a spindle of a dedicated servo writer (such as MDW 200). The alignment features on the discs are then used to substantially vertically align the discs. The disc alignment procedure includes biasing alternate discs on the spindle at 180-degree opposition (described further below in connection with FIG. 4). Thereafter, servo patterns are written on surfaces of the discs. After completion of step 308, the discs are unloaded from the dedicated servo writer and packaged (step 310). The discs are then shipped to a disc drive assembly plant (step 312) where drive level manufacturing steps 350 are carried out.

Drive level manufacturing steps 350 begin at step 352 where the pre-written discs are loaded onto a spindle base assembly that includes a spindle motor. At step 354, disc alignment and clamp installation operations are carried out. As in the case of the disc pre-writing process described above, the alignment features are used to vertically align the discs. Alternate discs on the drive spindle motor shaft are biased at 180-degree opposition. After aligning the discs, a clamp is installed to hold the discs in place on the spindle motor. At step 356, measurements relating to disc pack balance are carried out and, if necessary, suitable adjustments in balance are made. At step 358, other assembly operations, such as adjusting a range of movement of the actuator to which the heads are attached, are carried out. At step 360, a printed circuit board assembly (PCBA), which includes processors that carry out disc drive control functions, is installed. Thereafter, several functional tests are carried out to determine whether the assembled disc drive is in a condition for shipping to customers. Finished disc drives are then shipped for sale to customers (step 362).

In some embodiments of the present invention, the at least one alignment feature, which is formed at step 306 of disc level manufacturing process 300, is a laser mark formed on each disc surface. The laser mark is preferably created proximate disc inner diameter 124 (FIG. 1). In other embodiments of the present invention, removal of a small portion of each disc defines the at least one alignment feature. The small portions removed are preferably small segments of the discs. In should be noted that the order in which the different steps shown in FIG. 3 are carried out can change based upon the types of alignment features employed. For example, when formation of an alignment feature involves removal of a portion of the disc, it is preferable to carry out step 306 before step 304.

Figure 4:
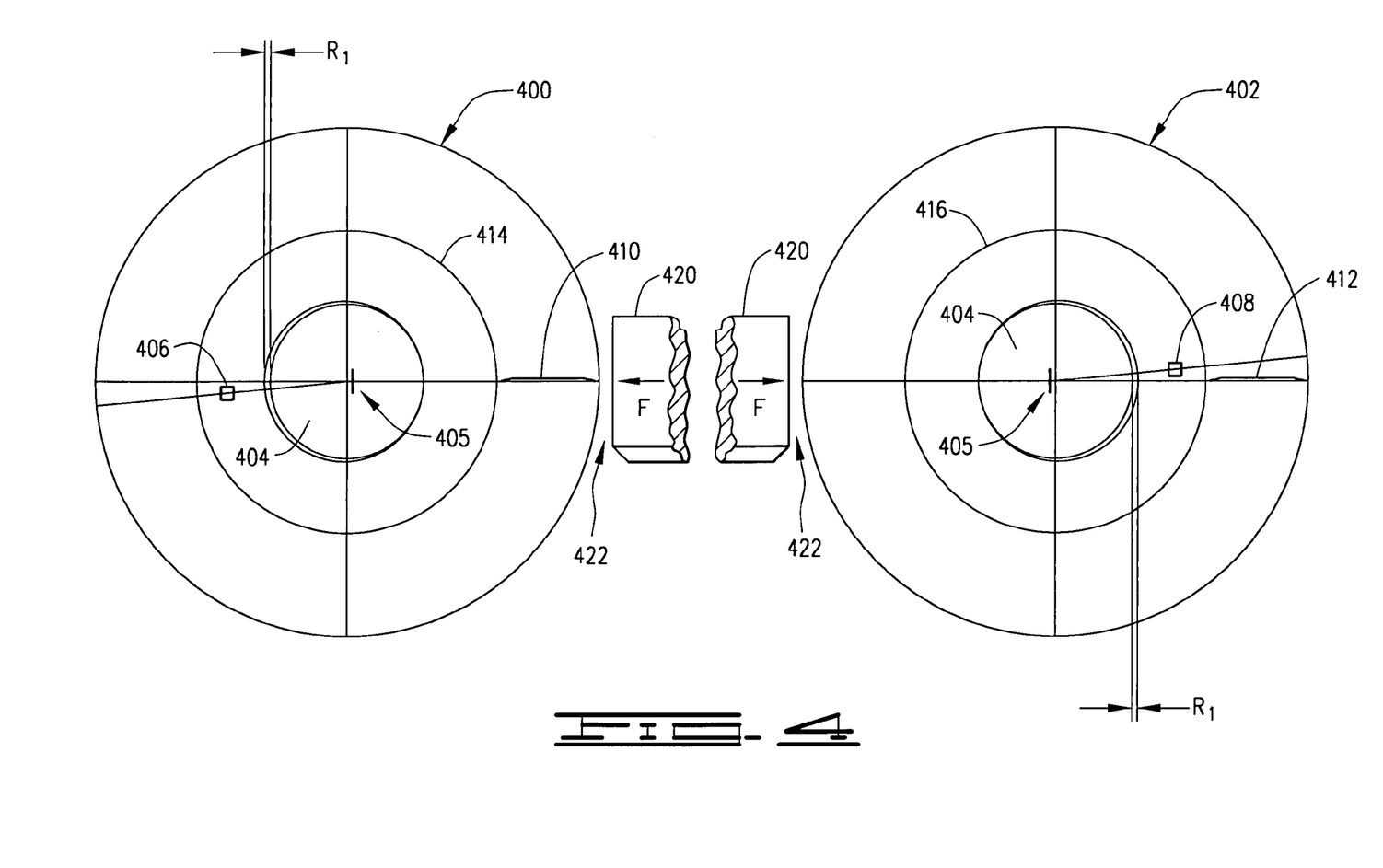
FIG. 4 is a simplified block diagram illustrating top surfaces of top and bottom discs of a disc pack employing laser mark alignment features.

FIG. 4 is a simplified block diagram illustrating a first or top disc 400 and a second of bottom disc 402 of a two-disc disc pack positioned on a spindle motor shaft 404 of a disc drive (such as 100) or a dedicated servo writer (such as MDW 200). Shaft or spindle 404 has a spindle center 405. For clarity, discs 400 and 402 are shown side by side instead of being shown in their actual overlapping or stacked position. FIG. 4 shows top surfaces of top disc 400 and bottom disc 402. Each disc 400, 402 includes a laser mark (alignment feature) 406, 408, a servo timing index 410,412 and servo tracks 414,416. Laser marks 406 and 408 are included on discs 400 and 402, using known techniques, before writing servo timing indexes 410 and 412 and servo tracks 414 and 416. An alignment tool that includes a vision system, a biasing member and a grasping member is used during the alignment process. The type of vision system, biasing member and grasping member employed are not important to the present invention. For simplification, only biasing member 420 of the alignment tool is shown. The grasping member (not shown) is employed to place discs 400 and 402 on spindle 404 and to help move discs 400 and 404 for alignment purposes. Discs 400 and 402 are biased in opposite directions (180-degree opposition) by applying force F, using biasing member 420, to each of discs 400 and 402 as shown in FIG. 4. The vision system (not shown) detects laser marks 406 and 408 and monitors relative positions of laser marks 406 and 408 during the alignment procedure. In some embodiments of the present invention, alignment adjustments in a dedicated servo writer are carried out such that laser marks 406 and 408 are positioned on opposite sides of spindle 404 at 180-degree opposition as shown in FIG. 4. In this alignment position, servo tracks such as 414 and 416 are written on discs 400 and 402. When discs 400 and 402 are installed in a disc drive, alignment adjustments are carried out such that a substantially similar alignment position (180-degree opposition) of laser marks 406 and 408 is attained. This ensures that servo timing indexes 410 and 412, and therefore servo tracks 414 and 416, are substantially vertically aligned.

Figure 5:
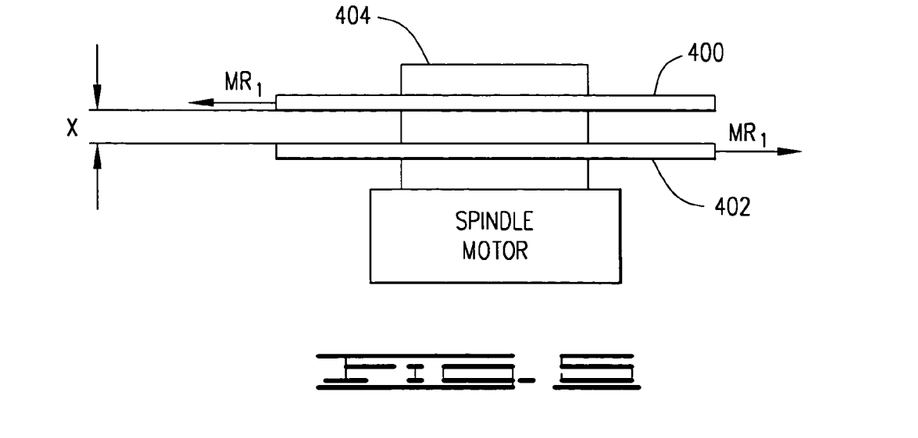
FIG. 5 is a simplified block diagram illustrating dynamic imbalance forces in a disc drive.
Figure 5A:
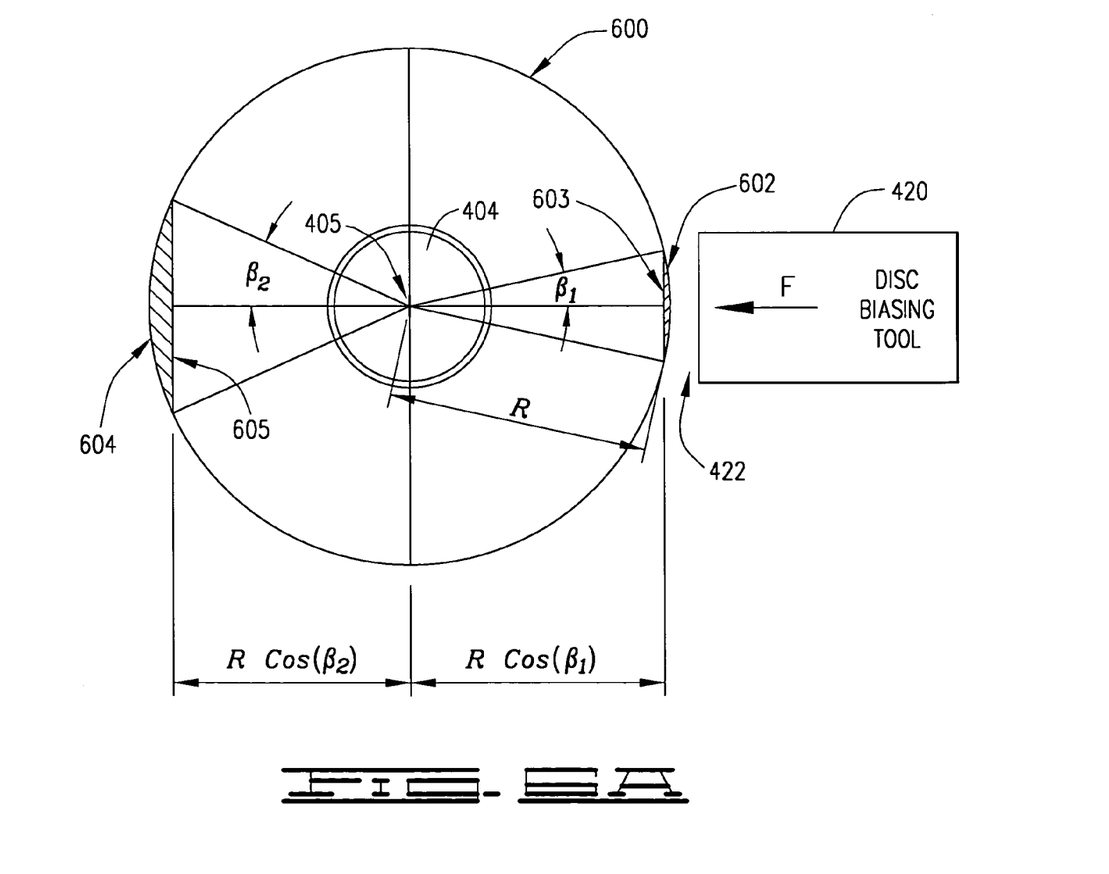

Although the alignment system employing laser marks provides relatively accurate alignment of servo patterns on discs 400 and 402, it is clear from FIG. 4 that substantially planar surface 422 of biasing member 420 is capable of making only point contact (contact with a very small area (essentially a point)) with edges of discs 400 and 402. Thus, very precise and balanced application of force F is required to facilitate proper biasing and accurate servo pattern alignment. This adds a degree of complexity to the above-described laser mark alignment process. Further, it is known that static imbalance in a disc pack (such as the two-disc disc pack of FIG. 4) is compensated for by biasing alternate discs (such as 400 and 402) at 180-degree opposition. However, biasing discs 400 and 402 at 180-degree opposition introduces a dynamic imbalance couple, which is described below in connection with FIG. 5. The dynamic imbalance couple (DIC) for the stacked discs 400 and 402 is expressed as:

$$DIC = M \times R_1 \times X \quad \text{Equation 1}$$

where M is a mass of each disc, $R_1$ (shown in FIG. 4) is a separation distance between shaft 404 and the disc inner diameter and X (shown in FIG. 5) is a separation distance between discs 400 and 402. The product of M and $R_1$ ($MR_1$ shown in FIG. 5) is an imbalance vector for each of discs 400 and 402. Embodiments of the present invention described below provide for greater contact area between planar surface 422 of biasing member 420 and the disc edge and also reduce the DIC.

Figure 6:
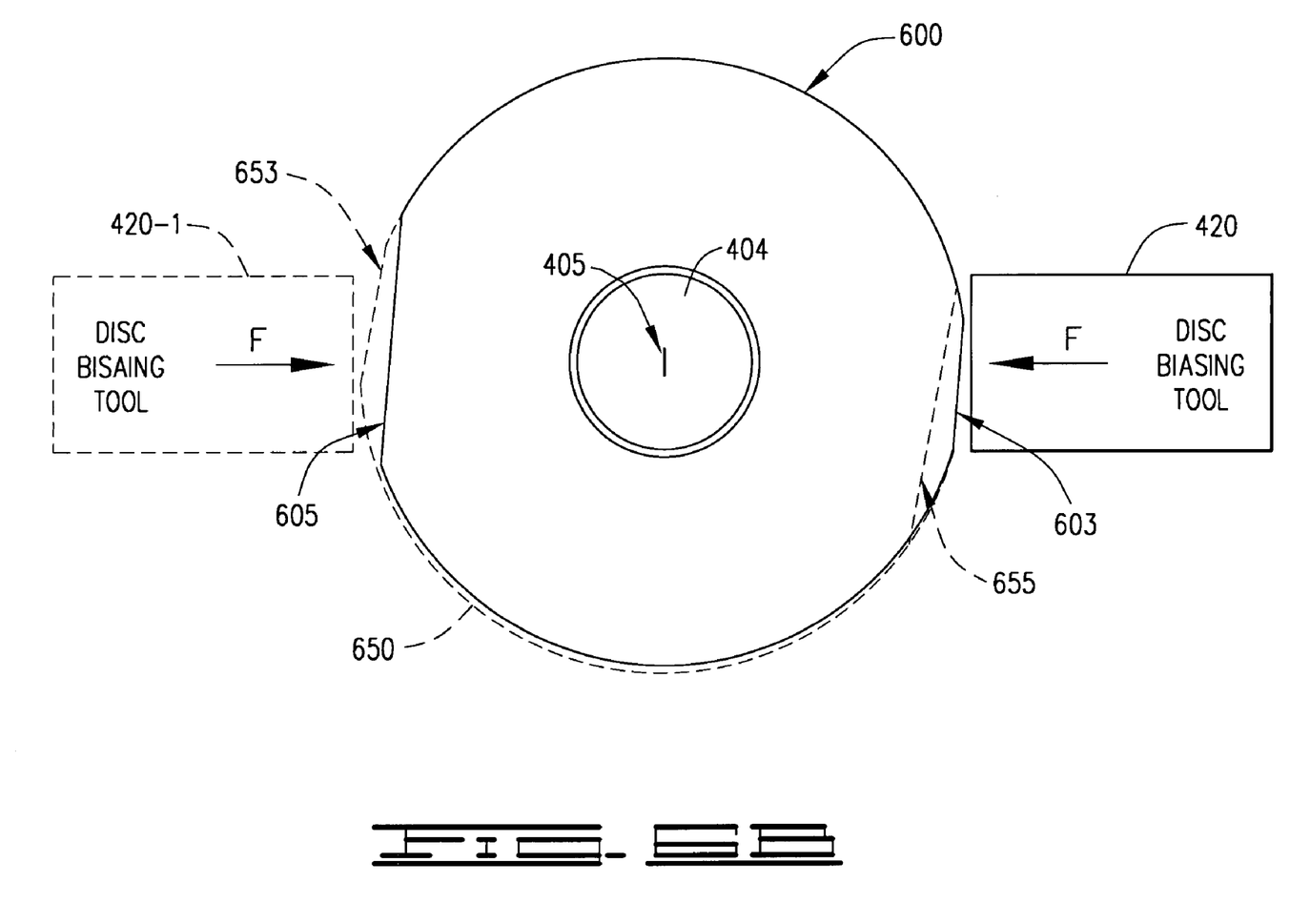
FIG. 6A is a simplified block diagram illustrating a top surface of a disc of a disc pack in which segments of discs are removed to form alignment features.
FIG. 6B is a simplified block diagram illustrating alignment and biasing of discs of a disc pack in which segments of discs are removed to form alignment features.

As mentioned above, in some embodiments of the present invention, removal of a portion of a disc defines an alignment feature. Such an alignment feature (formed by the removal of a portion of a disc) is included in each disc of a disc pack to help align servo patterns on different surfaces of the disc pack. FIG. 6A is a diagrammatic illustration of a single disc 600 of a multi-disc disc pack with first and second segments removed from regions 602 and 604, respectively. Any suitable cutting tool can be used to remove the first and second segments. It should be noted that segments that are substantially identical to the first and second segments are removed from all discs of the disc pack.

In FIG. 6A, only one disc is shown for simplification. Also, alternate discs in the disc pack are biased at 180-degree opposition. As can be seen in FIG. 6A, removal of the first segment from region 602 creates a substantially straight edge (alignment feature) 603. Biasing tool 420 can make contact with entire edge 603. Further, a direction of a final equilibrium force (described in detail further below), resulting from surface 422 of biasing tool 420 being in contact with the entire edge 603, is toward spindle center 405. This helps reduce disc instability during the biasing process. It should be noted that when substantially straight edge 603 is employed as the alignment feature, the laser mark alignment feature described above is not included on the disc and therefore the vision system is unnecessary in these embodiments. This further simplifies the disc biasing and servo pattern alignment processes.

Removal of the second segment from region 604 defines an imbalance reduction feature 605 which may be included to compensate for the DIC (Equation 1) resulting from disc offset due to biasing and due to the removal of the first segment from region 602. In embodiments of the present invention in which removal of a portion of the disc defines the alignment feature, the imbalance reduction feature is preferably positioned diametrically opposite the alignment feature. This helps reduce any imbalance introduced by the inclusion of the alignment feature.

FIG. 6B is a diagrammatic illustration of a two-disc disc pack in which disc 600 is a top disc and disc 650 is a bottom disc. Disc 600 is represented by a solid line and disc 650 is represented by a dashed line. Discs 600 and 650 are biased in opposite directions by biasing tools 420 and 420-1, respectively. When biasing forces F are applied to respective alignment features 603 and 653 of discs 600 and 650 as shown in FIG. 6B, both biasing and alignment of discs 600 and 650 takes place. This is because, as mentioned above, the direction of final equilibrium forces are toward spindle center 405 and therefore alignment of discs 600 and 650 (and servo patterns on discs 600 and 650) automatically takes place when discs 600 and 650 are biased. Imbalance reduction features 605 (of disc 600) and 655 (of disc 650) help balance the disc stack of FIG. 6B.

One factor that needs to be taken into consideration when removing segments at the OD of the discs is the loss of disc surface at the OD, which could be used for data tracks. Forming mathematical relationships based upon dimensions of the discs and a maximum allowable misalignment between servo patterns of different discs helps determine optimum segment sizes and thereby helps reduce the amount of radial track loss at the OD. Referring back to FIGS. 6A, $\beta_1$ and $\beta_2$ are the included angles of the first and second segments, respectively. R is the radius of disc 600 and therefore $R \cos(\beta_1)$ is the distance between spindle center 405 and the mid point of edge 603 and $R \cos(\beta_2)$ is the distance between spindle center 405 and the mid point of edge 605. For the purpose of calculating segment sizes, let "$OD_1$" be a disc outer diameter ($OD_1 = 2R$), let "$ID_1$" be a disc inner diameter, and let "$OD_2$" be a spindle motor shaft diameter. Let "T" be a disc thickness and let "d" be a disc substrate density. R, $OD_1$, $ID_1$, $OD_2$, T and d are known quantities. A value of $\beta_1$ (in degrees or radians) is selected based on the maximum allowable misalignment between servo patterns of different discs. Using the known quantities mentioned above, $MR_1$ (the disc imbalance without taking into consideration the equivalent imbalance due to the removal of segments) can be expressed and computed as:

$$MR_1 = T \times d \times \pi \times \frac{(OD_1 - ID_1)}{4} \times \frac{(ID_1 - OD_2)}{3} \quad \text{Equation 2}$$

Using the selected value of $\beta_1$ and the known quantities mentioned above, $MR_2$ (the equivalent imbalance due to the removal of the first segment) can be expressed and computed as:

$$MR_2 = T \times d \times \left\{ \int_0^R 2\beta_1(R)^2 dR - \frac{2}{3} R^3 \operatorname{Sin}\beta_1 \operatorname{Cos}^2\beta_1 \right\} \quad \text{Equation 3}$$

$MR_3$, which is the equivalent imbalance due to the removal of the second segment, acts in a direction opposite to $MR_1$ and $MR_2$. Thus, $MR_3$ is selected to cancel $MR_1$ and $MR_2$ and is therefore expressed as:

$$MR_3 = MR_1 + MR_2 \quad \text{Equation 4}$$

Equation 4 can be re-written as:

$$MR_3 = T \times d \times \frac{2}{3} R^3 \{\beta_2 - \operatorname{Sin}\beta_2 \operatorname{Cos}^2\beta_2\} \quad \text{Equation 5}$$

From Equation 5, a value of angle $\beta_2$ and therefore a size of the second segment can be determined. The drive residual equivalent imbalance ($MR_D$) is expressed as:

$$MR_D = MR_1 + MR_2 - MR_3 \quad \text{Equation 6}$$

Ideally, $MR_D$ has a value of zero. However, a small $MR_D$ usually exists due to design and manufacturing tolerances. Since the amount of track loss is dictated by the larger of the first and second segments, the radial track loss at the OD is expressed as:

$$\delta R = R(1 - \operatorname{Cos}\lambda) \quad \text{Equation 6}$$

where $\lambda$ is equal to $\beta_1$ if $\beta_1$ is greater than $\beta_2$, and $\lambda$ is equal to $\beta_2$ if $\beta_2$ is greater than $\beta_1$.

Figure 7:
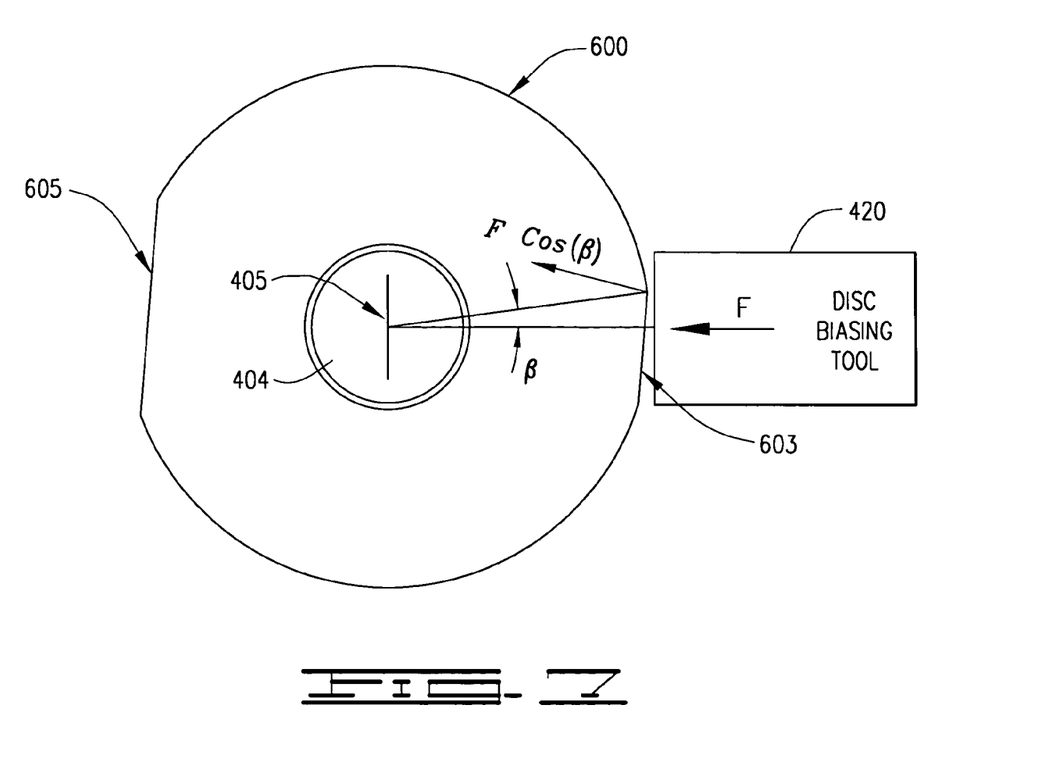
FIG. 7 is a simplified block diagram illustrating a direction of a force during biasing of discs of a disc pack in which segments of discs are removed to form alignment features.

As mentioned above, in connection with the embodiments shown in FIGS. 6A and 6B, the direction of final equilibrium biasing forces are toward spindle center 405 when biasing tool 420 is in contact with entire edge 603. FIG. 7 illustrates force directions when biasing tool 420 is in a position in which it can make initial contact with only a small portion of edge 603. When initial contact takes place between biasing tool 402 and edge 603 in the position shown if FIG. 3, the contact force will induce a torque that will rotate the disc to its equilibrium position. The equilibrium position is the position in which biasing tool 420 is in complete contact with edge 603. In FIG. 7, $\beta$ is the included angle when the initial force is applied. Thus, force component $F \operatorname{Cos}(\beta)$ causes the rotation of the disc to the equilibrium position. This tendency of the disc to move to the equilibrium position helps reduce the time required for biasing and alignment.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive data storage system while maintaining substantially the same functionality without departing from the scope and spirit of the present invention. In addition, although the preferred embodiment described herein is directed to aligning servo patterns on different disc surfaces of a disc pack employed in a disc drive data storage system, it will be appreciated by those skilled in the art that the teachings of the present invention can be applied to other similar systems, without departing from the scope and spirit of the present invention. The disc drive can be based upon magnetic, optical, or other storage technologies and may or may not employ a flying slider.

What is claimed is:

1. A method comprising:
   forming at least one alignment feature between an inner diameter and an outer diameter of each of a plurality of discs;
   utilizing the at least one alignment feature of a first disc of the plurality of discs and the at least one alignment feature of a second disc of the plurality of discs to substantially vertically align servo patterns on the first disc with servo patterns on the second disc; and
   forming at least one imbalance reduction feature on each of the plurality of discs.

2. The method of claim 1 wherein the forming the at least one alignment feature comprises forming at least one laser mark on each of the plurality of discs.

3. The method of claim 1 wherein the forming the at least one alignment feature comprises removing at least one segment from each of the plurality of discs.

4. The method of claim 1 wherein forming the at least one imbalance reduction feature comprises removing at least one segment from each of the plurality of discs.

5. The method of claim 1 wherein the at least one imbalance reduction feature of the first disc of the plurality of discs is formed diametrically opposite the at least one alignment feature of the first disc of the plurality of discs and the at least one imbalance reduction feature of the second disc of the plurality of discs is formed diametrically opposite the at least one alignment feature of the second disc of the plurality of discs.

6. The method of claim 1 wherein the servo patterns on the first disc and the servo patterns on the second disc are formed subsequent to carrying out the forming the at least one alignment feature.

7. The method of claim 1 further comprising utilizing the at least one alignment feature of each of the plurality of discs to bias each disc of the plurality of discs against a spindle motor shaft.

8. The method of claim 7 wherein alternate discs of the plurality of discs on the spindle motor shaft are biased at 180-degree opposition.

9. The method of claim 1 wherein the utilizing further comprises utilizing the at least one alignment feature of the first disc of the plurality of discs and the at least one alignment feature of the second disc of the plurality of discs to vertically align a servo timing index on the first disc with a servo timing index on the second disc.

* * * * *